United States Patent [19]

Ackerman

[11] 4,124,050

[45] Nov. 7, 1978

[54] ACTION PIERCING FASTENER

[75] Inventor: George L. Ackerman, Twin Lakes, Wis.

[73] Assignee: Action Machining Corp., Mundelein, Ill.

[21] Appl. No.: 824,339

[22] Filed: Aug. 15, 1977

Related U.S. Application Data

[63] Continuation of Ser. No. 720,262, Sep. 3, 1976, abandoned.

[51] Int. Cl.² ............................................. F16B 39/34
[52] U.S. Cl. ........................................ 29/798; 151/37; 151/41.73; 206/338
[58] Field of Search ............... 151/41.73, 41.71, 41.72, 151/41.74, 33.37; 206/338, 340, 343, 345, 346, 820; 29/798, 432

[56] References Cited

U.S. PATENT DOCUMENTS

| 2,327,656 | 8/1943 | Meek ......................... 151/41.72 |
| 2,561,638 | 7/1951 | Richardson ................ 151/41.72 |
| 2,749,606 | 6/1956 | Donahue .................... 151/41.73 |
| 2,861,617 | 11/1958 | Tinnerman ............... 151/41.73 |
| 3,152,628 | 10/1964 | Strain et al. ............... 151/41.73 |
| 3,187,796 | 6/1965 | Double ....................... 151/41.73 |
| 3,722,670 | 3/1973 | Plunkett .................... 206/340 |
| 3,724,520 | 8/1973 | Ladouceur et al. ....... 151/41.73 |
| 3,747,657 | 7/1973 | Ryder ......................... 151/37 |
| 3,845,860 | 11/1974 | Ladouceur et al. ....... 151/41.71 |
| 3,851,759 | 12/1974 | Young et al. .............. 206/338 |

FOREIGN PATENT DOCUMENTS

| 10,427 of | 1914 | United Kingdom ............ 151/37 |
| 1,141,879 | 2/1969 | United Kingdom ............ 151/41.73 |
| 1,200,139 | 7/1970 | United Kingdom ............ 151/41.73 |

Primary Examiner—J. Franklin Foss
Attorney, Agent, or Firm—Chas. W. Rummler

[57] ABSTRACT

A self-piercing fastener which locks itself to the metal panel upon which it is mounted for self-swaging its piercing portion to form automatic back taper thereof and by coining the margins of the pierced opening, the panel being disposed against a flat-top anvil having an opening therein providing clearance for discharge of the slug punched from the mounting material, and a method for securing self-piercing fasteners to a flat sheet metal panel.

2 Claims, 9 Drawing Figures

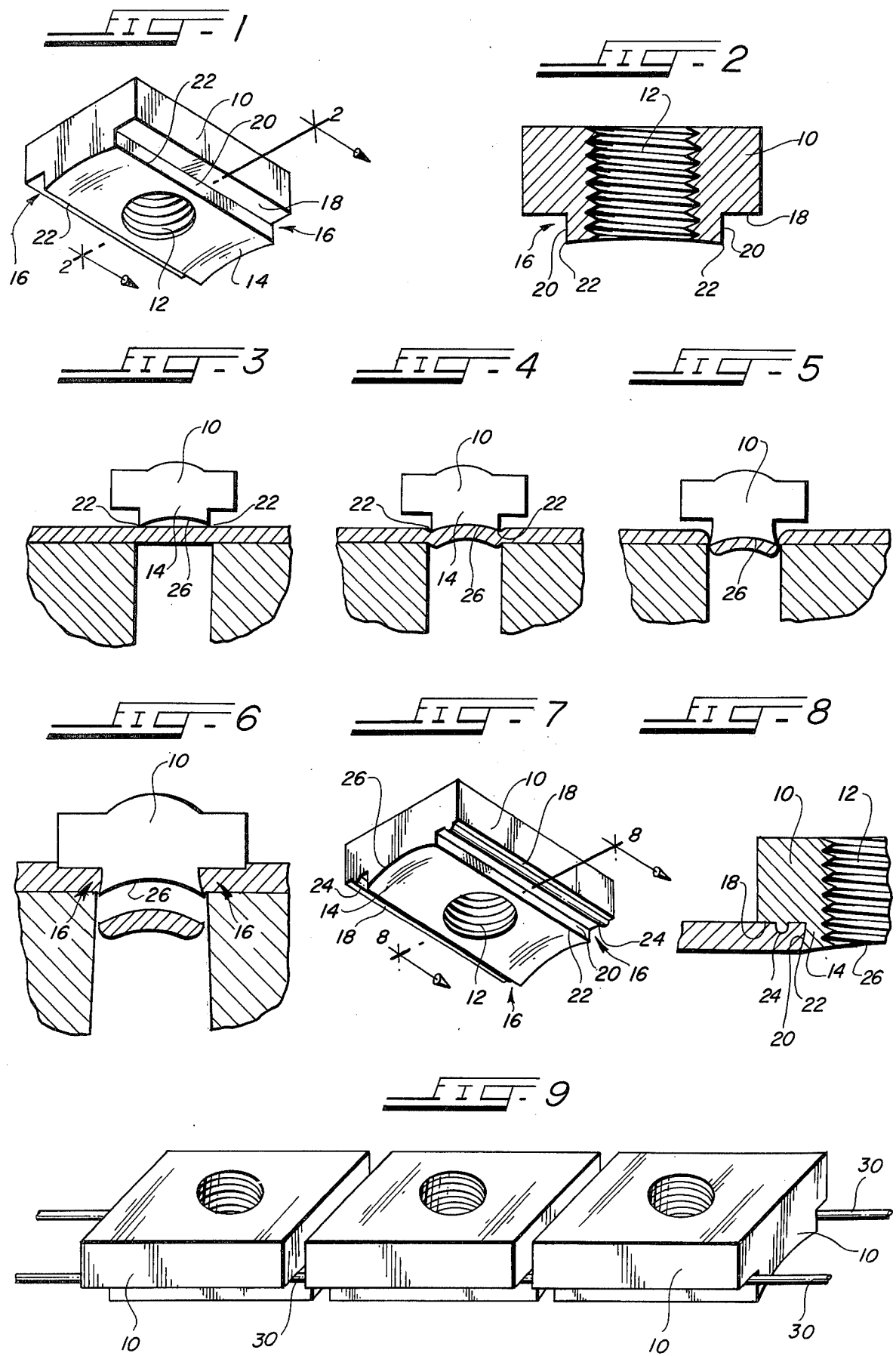

ACTION PIERCING FASTENER

This application is a continuation of my co-pending application Ser. No. 720,262 filed Sept. 3, 1976 now abandoned.

SUMMARY OF THE INVENTION

The gist of this invention is the provision of a T-shaped self-piercing fastener wherein the piercing leg portion is concaved between opposite sides of its piercing end to provide for outward swaging of the piercing end margins as the fastener is driven through the metal panel upon which it is to be mounted, the said panel being backed by an anvil having a flat top and an opening therein aligned with the said piercing leg for receiving the slug punched out by the piercing leg; and whereby the arms of the fastener coin the upper margins of the punched opening in the said panel to drive the same inwardly against the piercing leg of the fastener above the swaged margins of the piercing end thereof.

DESCRIPTION OF THE DRAWINGS

A specific embodiment of this invention is shown by the accompanying drawings, in which:

FIG. 1 is a perspective view of my improved fastener, shown as a self-piercing nut;

FIG. 2 is a cross-sectional view of the same taken on the line 2—2 of FIG. 1;

FIG. 3 is a view showing the step of aligning the fastener of this invention over a sheet metal panel positioned against an anvil having a flat surface and an opening therein for shear of the work and clearance of the slug to be punched from the panel;

FIG. 4 is a view showing the beginning of the punching or piercing step;

FIG. 5 shows the step of completing the piercing of the sheet metal panel and the self-swaging of the concaved piercing end of the fastener;

FIG. 6 is an enlarged view showing the completion of the step of coining and fastener clinching;

FIG. 7 shows a perspective view of a modified form of the fastener shown in FIG. 1;

FIG. 8 shows a fragmented cross-section of the same taken on line 8—8 of FIG. 7 to show the clinching action of the fastener arms; and FIG. 9 shows a fragmented section of a plurality of the fasteners arranged as a coil strip for automatic feeding of fasteners to a driving tool.

DESCRIPTION OF TYPICAL EMBODIMENTS OF THE INVENTION

The method of securing attachment of self-piercing fasteners to a metal panel according to the teachings of this invention comprises the steps of aligning the leading end of the fastener, which is positioned as desired on the sheet metal stock on which it is to be mounted, over a suitable opening in an anvil having a smooth flat top, as shown in FIG. 3; shearing said sheet metal stock with the piercing or punching portion of the fastener and driving the punched slug into an opening in the anvil having a working clearance with said piercing portion; automatically swaging the margins of the piercing portion of the fastener outwardly by the reaction of the metal of the panel to the punching force of the fastener mounting operation; and then directing the flow of material in the margins of the metal around the aperture punched therein toward the piercing portion of the fastener by the coining action of the arms of the fastener which extend from opposite sides of the fastener body. By this method the clinching of the fastener in the mounting material is done by the fastener itself without the aid of any die formations designed to deform the metal of the mounting material into a fastener locking relation.

FIG. 1 shows the improved fastener in the form of a nut which, according to the teachings of this invention, comprises a rectangular generally T-shaped body having a head portion 10 and a threaded hole 12 running centrally located therethrough; a rectangular punch or piercing portion 14 of the same length as head portion 10 depends therefrom, as the leg of the T-shaped body and the arms of the body provide right-angled relief portions 16 which run lengthwise of said head portion 10. The said arms provide shoulders 18, for the relief portions 16, having horizontally-disposed flat surfaces extending outwardly from respective sides of said piercing portion 14, equi-distant up from the piercing end of said portion 14. Flat vertically-disposed side surfaces 20 on the same opposite sides of said punch or piercing portion 14 depend from shoulders 18 and terminate in respective leading edges 22 at the leading or piercing end of the punch portion 14, as shown in FIG. 2. A concave surface 26 in the end of said punch portion 14 extends between the leading edges 22 of the same thereby reducing resistance to the before mentioned swaging action by relieving the metal behind the portion to be moved.

The slug punched out of the metal panel by the piercing or punch portion 14 of the fastener is received by and discharged through the opening in the anvil which opening is to be of the same peripheral shape as the punch portion 14 and slightly larger in each dimension. Preferably the anvil opening will be larger in each dimension than the punch portion 14 by about (5%) of the thickness of the metal panel onto which the fastener is to be mounted. In any event the anvil opening should be at least 0.005 inch larger, in each dimension, than the punch portion 14 of the fastener. This will allow the swaging of the leading edges 22 of the punch portion 14 as well as free fall of the slug punched from the metal panel.

As is customary for metal punching operation the anvil opening will be made to have side walls which are slightly tapered outwardly, as shown in FIG. 6, to assure clearance for discharge of the slugs as they are removed by the setting of fasteners into the panel being worked.

FIG. 7 shows a modification of my improved fastener wherein beads 24 extend longitudinally along the middle of the horizontal flat surfaces of shoulders 18 of the relief portions 16. The bead 24 may be of any desired shape and as shown in FIG. 8, its function is to drive into the top surface of the sheet metal as the fastener is seated and force the edges of the pierced opening into locking engagement with the leg 14 between the shoulders 18 and the swaged edges 22.

FIG. 9 shows a plurality of uniformly spaced fasteners connected in series as a coil strip for automatic feed to a driving tool. In this arrangement the fasteners are connected end to end, with the shoulders 18 in alignment, by means of a wire 30 spot welded to each shoulder on each side of each fastener. Here the wires 30 serve the same purpose as the beads 24 shown in FIGS. 7 and 8.

It will now be apparent that in spite of the utmost simplicity of the form of my improved self-piercing fastener, it is ideally adapted for use according to the before mentioned method of attachment to whatever mounting means for which fasteners of this type may be suitable. The particular form of the fastener leg or piercing portion adapts the device to self locking in the material to which it is applied, requiring only a flat surfaced anvil as backing, and completely obviates any need for the expensive dies heretofore required as backing for the fastener driving force. This self-locking action is illustrated by FIGS. 3 through 6 which show, step by step, the self-swaging expansion of the piercing end of the fastener as it pierces the metal to which it is mounted, the final form being shown in the enlarged FIG. 6 wherein the coined margins of the pierced opening are shown forced by the shoulders 18 into the automatically produced back taper at the sides of the piercing portion 14 to lock the fastener in place as it is finally seated on the work.

It will be understood that details of the construction shown may be altered or omitted without departing from the spirit of the invention as defined by the following claims.

I claim:

1. A self-piercing fastener and anvil combination comprising a T-shaped body the leg of which depends from between a pair of laterally-projecting arms the underside surfaces of which lie in a common plane, the said leg having flat side surfaces intersecting the common plane of the arms at right angles therewith, the said leg being the piercing portion of the fastener and having its end surface concaved from one of the flat side surfaces to the other, a flat top anvil having an opening therethrough of the same shape as the fastener leg and of a size to provide a shearing die-clearance when the said leg is entered into said opening, the said opening being tapered away from the top of the anvil.

2. A plurality of fasteners such as defined by claim 1 connected in end-to-end series, with the respective arms in alignment, by means of a wire secured to and extending along the underside surfaces of the aligned arms on each side of the fastener series, each wire extending the full length of said series.

* * * * *